(12) United States Patent
Umeda et al.

(10) Patent No.: US 11,273,478 B2
(45) Date of Patent: Mar. 15, 2022

(54) POWER TRANSMISSION DEVICE AND ROLLING MILL

(71) Applicant: MITSUBISHI HEAVY INDUSTRIES, LTD., Tokyo (JP)

(72) Inventors: Akihiko Umeda, Tokyo (JP); Katsuhiko Shoda, Tokyo (JP); Kensuke Nishiura, Tokyo (JP); Kazuma Otaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 225 days.

(21) Appl. No.: 16/637,055

(22) PCT Filed: Jun. 7, 2019

(86) PCT No.: PCT/JP2019/022687
§ 371 (c)(1),
(2) Date: Feb. 6, 2020

(87) PCT Pub. No.: WO2019/235607
PCT Pub. Date: Dec. 12, 2019

(65) Prior Publication Data
US 2020/0238352 A1    Jul. 30, 2020

(30) Foreign Application Priority Data

Jun. 7, 2018    (JP) .............................. JP2018-109132

(51) Int. Cl.
*B21B 35/14*    (2006.01)
*F16H 1/22*    (2006.01)
(Continued)

(52) U.S. Cl.
CPC .............. *B21B 35/14* (2013.01); *B21B 35/00* (2013.01); *B21B 35/12* (2013.01); *F16H 1/006* (2013.01); *F16H 1/22* (2013.01); *F16H 1/28* (2013.01)

(58) Field of Classification Search
CPC ........ B21B 35/00; B21B 35/12; B21B 35/14; B21B 35/141; F16H 1/006; F16H 1/22; F16H 1/28; F16H 1/227; F16H 2001/289
(Continued)

(56) References Cited

U.S. PATENT DOCUMENTS 3,293,898 A * 12/1966 Thomas ................. B21B 35/12
                                                    72/249
3,686,919 A *  8/1972 Brusa ..................... B21B 35/12
                                                    72/249
(Continued)

FOREIGN PATENT DOCUMENTS

DE    1602018 A1 *  6/1970 ............. B21B 35/12
GB     803809 A  * 11/1958 ............. B21B 35/12
(Continued)

OTHER PUBLICATIONS

International Search Report dated Jul. 16, 2019 in International (PCT) Application No. PCT/JP2019/022687.
(Continued)

*Primary Examiner* — Edward T Tolan
(74) *Attorney, Agent, or Firm* — Wenderoth, Lind & Ponack, L.L.P.

(57) ABSTRACT

A power transmission device includes a first power transmission path for transmitting a driving force of a motor to one driven shaft, and a second power transmission path for transmitting the driving force of the motor to another driven shaft. At least one of the first power transmission path or the second power transmission path includes a first intermediate
(Continued)

rotor fixed to an output shaft of the motor, a second intermediate rotor rotated by the first intermediate rotor and moving arcuately along an outer circumference of the first intermediate rotor, a driving shaft rotated by the second intermediate rotor and transmitting the driving force to the one driven shaft or the another driven shaft. The driving shaft is configured to move in a direction perpendicular to an axial center direction of the driving shaft in accordance with movement of the second intermediate rotor around the first intermediate rotor.

16 Claims, 9 Drawing Sheets

(51) Int. Cl.
*F16H 1/00* (2006.01)
*B21B 35/12* (2006.01)
*B21B 35/00* (2006.01)
*F16H 1/28* (2006.01)

(58) Field of Classification Search
USPC .......................................................... 72/249
See application file for complete search history.

(56) References Cited

U.S. PATENT DOCUMENTS

| | | | | |
|---|---|---|---|---|
| 4,385,530 A | * | 5/1983 | Holthoff | B21B 35/12 475/1 |
| 5,611,233 A | * | 3/1997 | Basstein | B21B 35/12 492/15 |
| 2001/0008985 A1 | | 7/2001 | Wada | |

FOREIGN PATENT DOCUMENTS

| | | |
|---|---|---|
| JP | 32-11596 | 9/1957 |
| JP | 51-079516 | 6/1976 |
| JP | 51-084301 | 7/1976 |
| JP | 56-143845 | 11/1981 |
| JP | 3791663 | 6/2006 |
| JP | 5984910 | 9/2016 |

OTHER PUBLICATIONS

Written Opinion of the International Searching Authority dated Jul. 16, 2019 in International (PCT) Application No. PCT/JP2019/022687.

* cited by examiner

POWER TRANSMISSION DEVICE AND ROLLING MILL

TECHNICAL FIELD

The present disclosure relates to a power transmission device and a rolling mill.

BACKGROUND

Conventionally, a rolling mill is known, which sandwiches a metal plate between two mill rolls arranged to face each other, passes the metal plate by rotating the both mill rolls to be expanded/rolled, thereby processing the metal plate into a plate member.

In addition, although not the rolling mill, for example, Patent Document 1 discloses a gear for a turning device which rotates the axial center position of a driving gear about another gear shaft to disengage the driving gear from a driven gear.

CITATION LIST

Patent Literature

Patent Document 1: JP5984910B

SUMMARY

Technical Problem

Meanwhile, in the above-described rolling mill, it is necessary to change a center-to-center distance of the two mill rolls in order to change a plate thickness and do maintenance. On the other hand, in a gear device applying a rotational force to each of the above-described two rolling mills via a shaft coupling, an inter-axial distance between two output shafts is generally fixed. Thus, shaft couplings such as a universal joint and a gear coupling are adopted in order to follow the change in inter-axial distance of the rolling mills. However, restrictions are imposed on an inclination angle and a transmission torque of each of the shaft couplings, and each of the shaft couplings needs to be extended in order to reliably transmit the torque at the inclination angle of not more than an allowable value. Such an extended shaft coupling causes a problem in that a vibration and an installation area increase, and costs of manufacture, replacement, and the like also increase.

In this regard, Patent Document 1 does not disclose any specific measure for solving the above-described problems.

In view of the above-described problems, an object of at least one embodiment of the present disclosure is to provide a configuration in which a torque is transmitted following an inter-axial distance of driven shafts while suppressing a contact area.

Solution to Problem (1) A power transmission device according to at least one embodiment of the present disclosure includes a first power transmission path for transmitting a driving force of a motor to one driven shaft, and a second power transmission path for transmitting the driving force of the motor to another driven shaft arranged to face the one driven shaft. At least one of the first power transmission path or the second power transmission path includes a first intermediate rotor which has an axial center position fixed to an output shaft of the motor and is rotated by the driving force of the motor, a second intermediate rotor rotated by the first intermediate rotor and moving along an outer circumference of the first intermediate rotor, and a driving shaft rotated by the second intermediate rotor and transmitting the driving force to the one driven shaft or the another driven shaft. The driving shaft is configured to move in a direction perpendicular to an axial center direction of the driving shaft in accordance with movement of the second intermediate rotor around the first intermediate rotor.

With the above configuration (1), since the second intermediate rotor moves along the outer circumference of the first intermediate rotor whose axial center position is fixed to the output shaft of the motor, the driving shaft of at least one of the first power transmission path or the second power transmission path moves in the direction perpendicular to the axial center direction. Thus, it is possible to suppress misalignment between the driving shaft and the driven shaft connected to the driving shaft, making it possible to transmit a torque with high efficiency following an inter-axial distance of the driven shafts while suppressing a contact area by suppressing extension of shaft couplings. Moreover, it is possible to increase the area of an engagement surface or a friction surface between the driving shaft and the driven shaft contributing to power transmission. Thus, it is possible to, for example, reduce the diameter of each of the shaft couplings when the same torque is transmitted. In other words, it is possible to increase a load capacity if the diameter of the shaft coupling is the same. Furthermore, it is possible to prevent breakage owing to partial contact or an increase in load on a tooth surface, and to reduce a surface pressure and sliding of the tooth surface at the time of power transmission. Thus, it is possible to increase the lifetime of the device by suppressing friction.

(2) In some embodiments, in the above configuration (1), the power transmission device may be configured such that such that a movement trajectory of an axial center of the second intermediate rotor makes a circular arc of a circle centered at an axial center of the first intermediate rotor.

With the above configuration (2), the second intermediate rotor performs circular arc movement such that the movement trajectory of the axial center of the second intermediate rotor makes the circular arc centered at the axial center of the first intermediate rotor in accordance with vertical movement of the driving shaft or the driven shafts. Thus, it is possible to always ensure a smooth engaged state and to reliably transmit the driving force of the motor to the driven shafts.

(3) In some embodiments, in the above configuration (1) or (2), at least one of the first power transmission path or the second power transmission path may include at least one pair of first intermediate rotors arranged on one side and the other side across the output shaft of the motor, and a pair of second intermediate rotors arranged on the one side and the other side across the output shaft of the motor.

With the above configuration (3), since the driving force of the motor is transmitted by the pair of, that is, a plurality of rotors, it is possible to decrease the diameter of each of the rotors as compared with a case in which, for example, one rotor transmits the same torque. Thus, it is possible to reduce the size of the power transmission device.

(4) In some embodiments, in the above configuration (3), the first intermediate rotors may be arranged symmetrically across the driving shaft, and the second intermediate rotors may be arranged symmetrically across the driving shaft.

With the above configuration (4), since the first intermediate rotors are arranged symmetrically across the driving shaft, and the second intermediate rotors are arranged symmetrically across the driving shaft, it is possible to provide the power transmission device which can be decreased in size while suppressing vibrations at the time of power transmission.

(5) In some embodiments, in the above configuration (4), the driving shaft may include a first driving shaft constituting the first power transmission path and moving in a first moving direction in accordance with movement of the second intermediate rotor around the first intermediate rotor of the first power transmission path, and a second driving shaft constituting the second power transmission path and moving in a second moving direction opposite to the first moving direction in accordance with movement of the second intermediate rotor around the first intermediate rotor of the second power transmission path.

With the above configuration (5), since the first driving shaft and the second driving shaft respectively move in the first moving direction and the second moving direction opposite to each other, it is possible to move the one driven shaft coupled to the first driving shaft and the another driven shaft coupled to the second driving shaft to contact/separate from each other by changing a distance therebetween.

(6) In some embodiments, in the above configuration (5), the first driving shaft may be configured to move in the first moving direction when the second intermediate rotor of the first power transmission path rotates about the axial center of the first intermediate rotor in one direction of either a clockwise direction or a counterclockwise direction as viewed from the axial center direction, and the second driving shaft may be configured to move in the second moving direction when the second intermediate rotor of the second power transmission path rotates about the axial center of the first intermediate rotor in the other direction of either the clockwise direction or the counterclockwise direction as viewed from the axial center direction.

With the above configuration (6), the first driving shaft moves in the first moving direction when the second intermediate rotor of the first power transmission path rotates in one direction of either the clockwise direction or the counterclockwise direction as viewed from the axial center direction, and the second driving shaft moves in the second moving direction when the second intermediate rotor of the second power transmission path rotates in the other direction of either the clockwise direction or the counterclockwise direction as viewed from the above-described axial direction. That is, it is possible to move the first driving shaft and the second driving shaft in the different directions by rotating the second intermediate rotor of the first power transmission path and the second intermediate rotor of the second power transmission path about the axial center of the first intermediate rotor in the different directions as viewed from the same axial direction. Alternatively, it may be possible to move the first driving shaft and the second driving shaft in the same direction by rotating the second intermediate rotor of the first power transmission path and the second intermediate rotor of the second power transmission path about the axial center of the first intermediate rotor in the same direction as viewed from the same axial direction.

(7) In some embodiments, in the above configuration (5) or (6), the first driving shaft may be arranged to be shifted from the second driving shaft in the axial center direction and may be arranged so as not to overlap the second driving shaft in a planar view.

With the above configuration (7), since the first driving shaft is shifted from the second driving shaft in the axial center direction and does not overlap the second driving shaft in the planar view, it is possible to avoid interference between both the driving shafts, which is caused when the first driving shaft and the second driving shaft respectively follow the one driven shaft and the another driven shaft. Therefore, it is possible to provide the power transmission device reliably transmitting a torque while smoothly following the change in inter-axial distance of the driven shafts.

(8) In some embodiments, in any one of the above configurations (1) to (7), the first power transmission path and the second power transmission path may each include the first intermediate rotor, the second intermediate rotor, and the driving shaft.

With the above configuration (8), the respective driving shafts of the first power transmission path and the second power transmission path are configured to move in the direction perpendicular to the axial center direction. Therefore, it is possible to smoothly follow even displacement of either driven shaft when the inter-axial distance of the driven shafts changes.

(9) In some embodiments, in any one of the above configurations (1) to (8), the power transmission device may further include a link which maintains a constant axial-center distance between the first intermediate rotor and the second intermediate rotor rotated by the first intermediate rotor.

With the above configuration (9), the link maintains the constant axial-center distance between the first intermediate rotor and the second intermediate rotor. Therefore, it is possible to reliably transmit power without any sliding or idling occurring between both the intermediate rotors even if the second intermediate rotor moves on the circular arc of the first intermediate rotor along with movement of the driving shaft following the change in inter-axial distance of the driven shafts.

(10) In some embodiments, in the above configuration (9), the power transmission device may further include a first drive portion which is connected to a point of effort of the link holding the second intermediate rotor at a point of load with an axial center of the first intermediate rotor as a fulcrum, the first drive portion applying a swing force of moving the second intermediate rotor along the circular arc of the first intermediate rotor such that a movement trajectory of an axial center of the second intermediate rotor makes a circular arc of a circle centered at the axial center of the first intermediate rotor.

With the above configuration (10), the first drive portion can actively move the second intermediate rotor along the circular arc of the first intermediate rotor. Thus, it is possible to reduce a load on the driving shaft associated with the change in inter-axial distance of the driven shafts if the change in inter-axial distance of the driven shafts and movement of the second intermediate rotor by the first drive portion are synchronized with each other, for example.

(11) In some embodiments, in any one of the above configurations (1) to (10), the power transmission device may further include a second drive portion for moving the driving shaft in the direction perpendicular to the axial center direction.

With the above configuration (11), the second drive portion moves the driving shaft in the direction perpendicular to the axial center direction. Thus, it is possible to reduce a load on the driving shaft associated with the change in inter-axial distance of the driven shafts if the change in inter-axial distance of the driven shafts and movement of the first driving shaft by the second drive portion are synchronized with each other, for example.

(12) In some embodiments, in any one of the above configurations (1) to (11), the output shaft of the motor, the first intermediate rotor, the second intermediate rotor, and the driving shaft may be configured to respectively include gears in outer circumferences thereof and to transmit power by engaging with each other via the gears.

With the above configuration (12), the output shaft of the motor, the first intermediate rotor, the second intermediate rotor, or the driving shaft are configured to include the gears. Thus, it is possible to reliably transmit the driving force of the motor to the driven shafts.

(13) In some embodiments, in any one of the above configurations (1) to (11), the output shaft of the motor, the first intermediate rotor, the second intermediate rotor, or the driving shaft may include a roller.

With the above configuration (13), the output shaft of the motor, the first intermediate rotor, the second intermediate rotor, or the driving shaft are configured to include the roller. Thus, it is possible to reduce vibrations and operating noise at the time of operation.

(14) A rolling mill according to at least one embodiment of the present disclosure includes the power transmission device according to any one of the above configurations (1) to (12), and the one driven shaft and the another driven shaft rotated by the driving shaft of the power transmission device. The one driven shaft and the another driven shaft include a pair of mill rolls having a variable inter-axial distance therebetween.

With the above configuration (14), as described in the above configuration (1), it is possible to obtain the rolling mill which includes the power transmission device capable of suppressing misalignment between the driving shaft and the driven shafts, and transmitting the torque with high efficiency following the inter-axial distance of the driven shafts while suppressing the contact area by suppressing extension of the shaft couplings.

(15) In some embodiments, in the above configuration (14), the rolling mill may further include a third drive portion applying power to change the inter-axial distance of the pair of mill rolls, and the pair of mill rolls and the pair of driving shafts may each be configured to maintain the same inter-axial distance by causing at least the third drive portion and the drive portion for moving the driving shaft in the direction perpendicular to the axial center direction to work together.

With the above configuration (15), it is possible to maintain the same inter-axial distance between each of the pair of mill rolls and the pair of driving shafts while suppressing a load between the pair of mill rolls and the pair of driving shafts by causing at least the drive portion (for example, the second drive portion) moving the driving shaft in the direction perpendicular to the axial center direction and the third drive portion applying power to change the inter-axial distance of the pair of mill rolls to work together. Thus, it is possible to extend the lifetime of the device.

Advantageous Effects

According to at least one embodiment of the present disclosure, it is possible to provide a configuration in which a torque is transmitted following an inter-axial distance of driven shafts while suppressing a contact area.

DETAILED DESCRIPTION

Embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
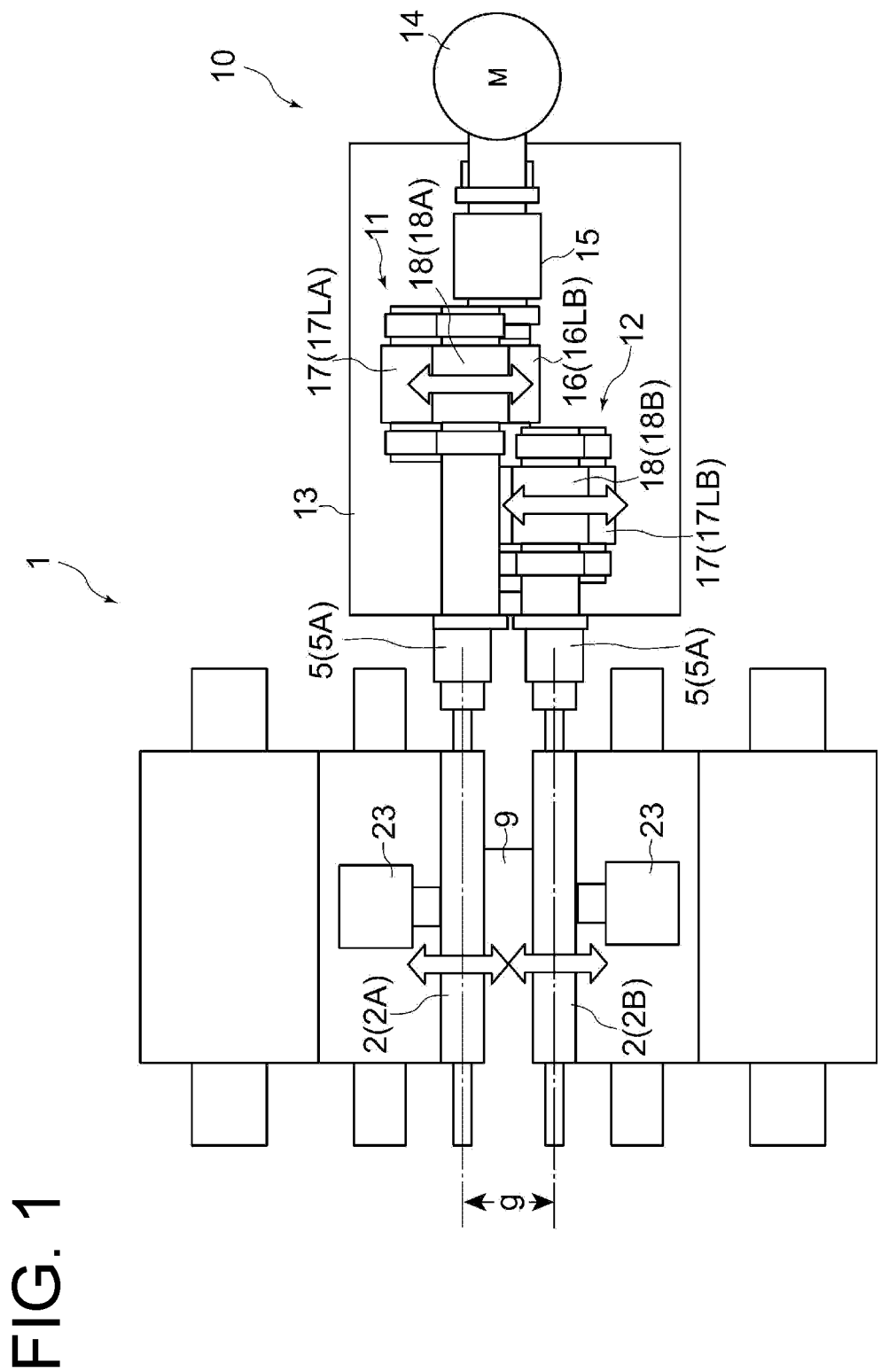
FIG. 1 is a schematic view showing a configuration example of a rolling mill according to at least one embodiment of the present disclosure.

FIG. 1 is a schematic view showing a configuration example of a rolling mill according to at least one embodiment of the present disclosure.

As shown in FIG. 1 as a non-limited example, a rolling mill 1 according to at least one embodiment of the present disclosure includes a power transmission device 10 according to any embodiment of the present disclosure, and a pair of mill rolls 2 (2A, 2B) serving as one driven shaft and another driven shaft rotated by driving shafts 18 of the power transmission device 10. In addition, the rolling mill 1 includes drive portions (for example, third drive portions 23 to be described later) which apply power to change an inter-axial distance of the pair of mill rolls 2.

For example, as shown in FIG. 1, the pair of mill rolls 2 are configured to be arranged in parallel to each other at intervals, and to have a variable inter-axial distance g (for example, a distance between axial centers or a distance between circumferences) therebetween. The pair of mill rolls 2 sandwich a metal plate 9 therebetween, for example. The mill rolls 2 rotate opposite to each other, thereby passing the metal plate 9 to be expanded/rolled and processing the metal plate 9 into a plate member.

The power transmission device 10 is configured to be able to suppress misalignment between the driving shafts 18 and the driven shafts (for example, the mill rolls 2), as will be described later. It is possible to obtain the rolling mill 1 which includes the power transmission device 10 capable of transmitting a torque with high efficiency following an inter-axial distance of the driven shafts while suppressing a contact area by suppressing extension of shaft couplings 5.

Subsequently, the power transmission device 10 according to at least one embodiment of the present disclosure will be described.

Figure 2:
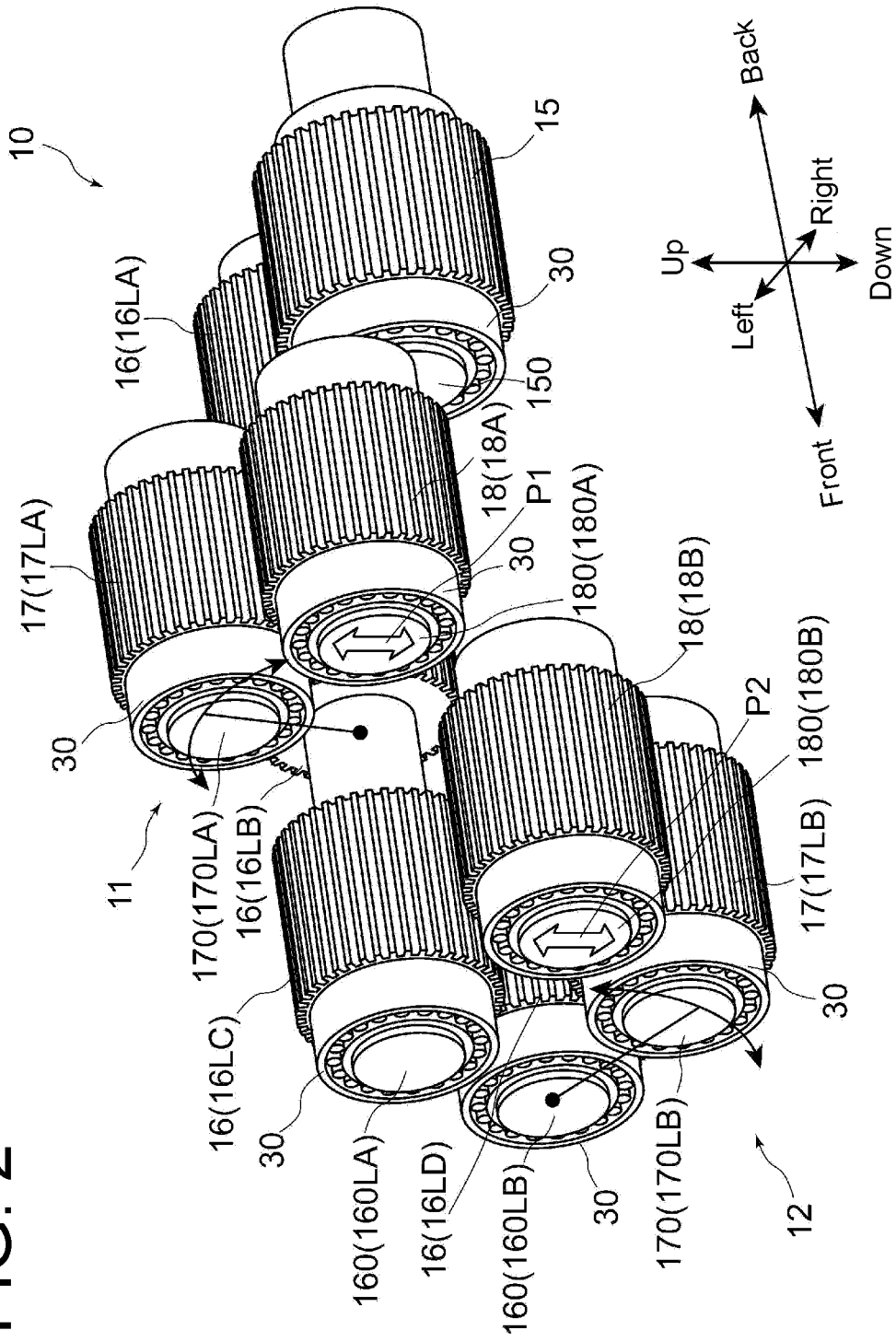
FIG. 2 is a schematic perspective view showing a part of a power transmission device according to at least one embodiment of the present disclosure.
Figure 3:
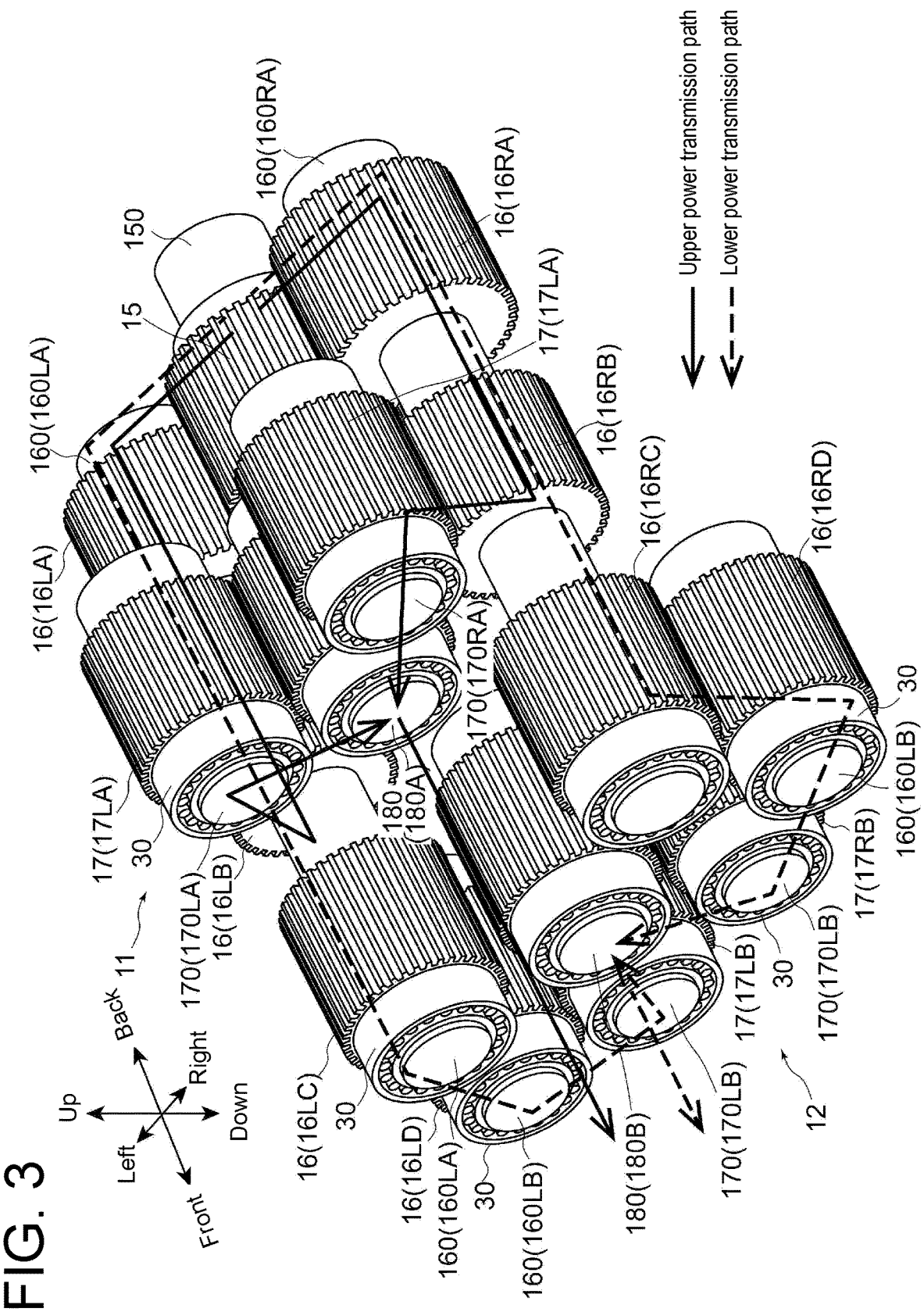
FIG. 3 is a schematic perspective view showing a configuration example of the power transmission device according to an embodiment.
Figure 4:
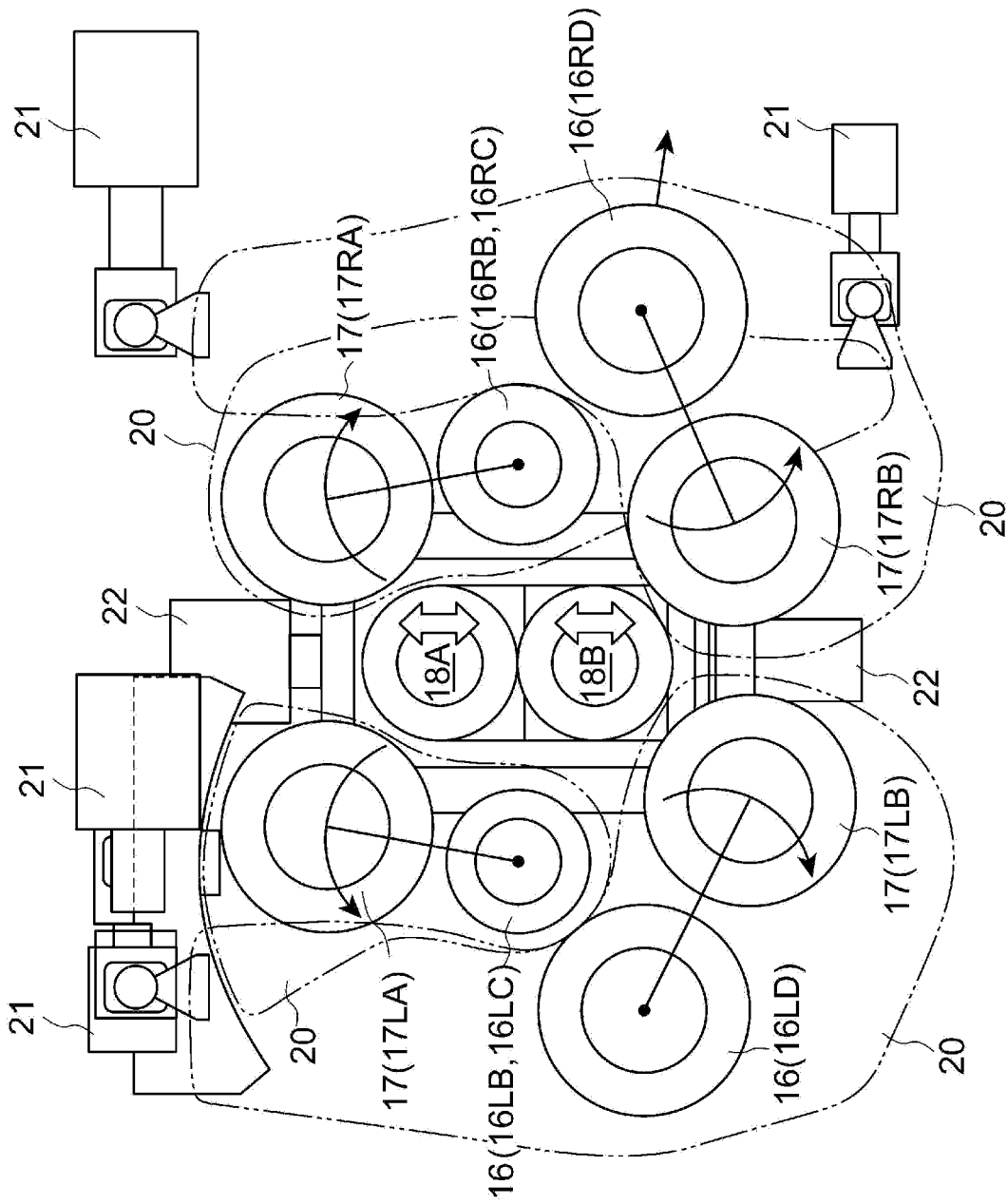
FIG. 4 is a schematic view showing a configuration example of the power transmission device according to an embodiment.

FIG. 2 is a schematic perspective view showing a part of the power transmission device according to at least one embodiment of the present disclosure. FIG. 3 is a schematic perspective view showing a configuration example of the power transmission device according to an embodiment. FIG. 4 is a schematic view showing a configuration example of the power transmission device according to an embodiment.

As illustrated in FIGS. 1 to 4, the power transmission device 10 according to at least one embodiment of the present disclosure includes a first power transmission path 11 for transmitting a driving force of a motor 14 to one driven shaft 2 (for example, the mill roll 2A), and a second power transmission path 12 for transmitting, to the another driven shaft 2 (for example, the mill roll 2B) arranged to face the above-described one driven shaft, the driving force of the motor 14 as a rotational force opposite to that of the above-described one driven shaft 2. The power transmission device 10 also includes a casing 13 which accommodates the above-described first power transmission path 11 and second power transmission path 12.

Only one of the first power transmission path 11 and the second power transmission path 12 is provided in accordance with the arrangement of each of the driven shafts 2, or the first power transmission path 11 and the second power transmission path 12 are in a positional relationship to be respectively arranged up and down, right and left, or the like.

At least one of the first power transmission path 11 or the second power transmission path 12 is configured to include a first intermediate rotor 16, a second intermediate rotor 17, and the driving shaft 18. The first intermediate rotor 16 has an axial center position fixed to an output shaft 15 of the motor 14 and is rotated by the driving force of the motor 14. The second intermediate rotor 17 is rotated by the first intermediate rotor 16 and moving along the outer circumference of the first intermediate rotor 16. The driving shaft 18 is rotated by the second intermediate rotor 17 and transmitting the driving force to the one driven shaft or the another driven shaft.

For example, FIGS. 1 to 4 each show a configuration example where, in a configuration in which the power transmission device 10 includes the first power transmission path 11 and the second power transmission path 12, each of the first power transmission path 11 and the second power transmission path 12 includes the first intermediate rotor 16, the second intermediate rotor 17, and the driving shaft 18. More specifically, FIGS. 1 and 2 each show a configuration in which the above-described first power transmission path 11 and second power transmission path 12 are provided only on the left side, and FIGS. 3 and 4 each show a configuration in which the above-described first power transmission path 11 and second power transmission path 12 are provided on both the right side and the left side.

The output shaft 15, the first intermediate rotor 16, the second intermediate rotor 17, and the driving shaft 18 are each supported such that the axial center thereof rotates in the casing 13 via a corresponding one of bearings 30. More specifically, a rotating shaft 160LA of the first intermediate rotor 16 and a rotating shaft 170LA of the second intermediate rotor 17, a rotating shaft 160LB and a rotating shaft 170LB, rotating shafts 160RA and 170RA, and rotating shafts 160RB and 170RB are respectively coupled to each other with links 20 to be described later via the bearings 30. Moreover, the driving shaft 18 is supported by a frame 19A to be described later via a rotating shaft 180A (180B) and the bearing 30. The frame 19A is driven by a second drive portion 22 to be described later to be guided vertically along a support 19B (to be described later).

In some embodiments, for example, as shown in FIGS. 2 and 3, the output shaft 15 of the motor 14, the first intermediate rotors 16, the second intermediate rotors 17, and the driving shafts 18 are provided with gears, which rotate integrally with each of a rotating shaft 150 and the rotating shafts 160LA, 160LB, 160RA, 160RB, 170LA, 170LB, 180A, 180B, in the outer circumference of each of the rotating shafts. The output shaft 15 of the motor 14, the first intermediate rotors 16, the second intermediate rotors 17, and the driving shafts 18 may be configured to transmit power by engaging with each other via the gears. That is, the output shaft 15 of the motor 14 and the first intermediate rotors 16 (more specifically, torque receiving portions 16A to be described later), the first intermediate rotors 16 (more specifically, second torque transmitting portions 16C to be described later) and the first intermediate rotors 16 (more specifically, first intermediate rotors 16D to be described later), the first intermediate rotors 16 (more specifically, first torque transmitting portions 16B to be described later) and the second intermediate rotors 17, and the second intermediate rotors 17 and the driving shafts 18 can be configured to transmit rotational torques by engaging with each other via the gears provided in the respective outer circumferences thereof. The rotating shaft 160LA arranged adjacent to (on the left side of) the output shaft 15 is longer than the other rotating shafts in the axial center direction. The torque receiving portion 16LA, the first torque transmitting portion 16LB, and the second torque transmitting portion 16LC each serving as the first intermediate rotor 16 are provided in order of closeness to the output shaft 15. Likewise, the rotating shaft 160RA arranged adjacent to (on the right side of) the output shaft 15 is longer than the other rotating shafts in the axial center direction. The torque receiving portion 16RA, the first torque transmitting portion 16RB, and the second torque transmitting portion 16RC each serving as the first intermediate rotor 16 are provided in order of closeness to the output shaft 15.

As described above, if the outer circumferences of the output shaft 15 of the motor 14, the first intermediate rotors 16, the second intermediate rotors 17, and the driving shafts 18 are formed by the gears, the second intermediate rotors 17 perform circular arc movement such that a movement trajectory of the axial center of each of the second intermediate rotors 17 makes a circular arc of a circle centered at the axial center of a corresponding one of the first intermediate rotors 16, in accordance with a change in gear positions associated with vertical movement of the driving shafts 18 or the driven shafts 2. Thus, it is possible to always ensure a smooth engaged state and to reliably transmit the driving force of the motor 14 to the driven shafts 2. The fact that "the second intermediate rotors 17 each arcuately move along the circumferential direction of the corresponding one of the first intermediate rotors 16" includes the fact that "the second intermediate rotors 17 each move so as to make the circular arc of the circle centered as the axial center of the corresponding one of the first intermediate rotors 16".

The first intermediate rotors 16 are each supported so as to rotate while maintaining a constant distance between the rotation center axis thereof and the rotation center axis of the output shaft 15. The first intermediate rotors 16 are each arranged in parallel to the output shaft 15, each have a fixed relative positional relationship between the rotation center axis thereof and the rotation center axis of the output shaft 15, and thus can also be referred to as, for example, fixed gears.

As shown in FIGS. 2 and 3, the first intermediate rotors 16 are formed to be longer than the output shaft 15 in the axial direction. The first intermediate rotors 16 are each configured such that the outer circumference thereof on one end side close to the output shaft 15 serves as the torque receiving portion 16A receiving the torque from the output shaft 15 (more specifically, for example, the torque receiving portion 16A arranged on the left side is the torque receiving portion 16LA, the torque receiving portion 16A arranged on the right side is the torque receiving portion 16RA in FIG. 4; the same applies hereafter). Moreover, the outer circumference of each of the first intermediate rotors 16 in the middle of the longitudinal direction is configured as the first torque transmitting portion 16B (the first torque transmitting portion 16LB on the left side, the first torque transmitting portion 16RB on the right side) transmitting the torque to a corresponding one of the second intermediate rotors 17 in the first power transmission path 11. Furthermore, the outer circumference of each of the first intermediate rotors 16 on the other end side which is far from the output shaft 15 is configured as the second torque transmitting portion 16C (the second torque transmitting portion 16LC on the left side, the second torque transmitting portion 16RC on the right side) transmitting the torque to the corresponding one of the second intermediate rotors 17 in the second power transmission path 12.

In some embodiments, for example, as shown in FIGS. 1 to 4, the first power transmission path 11 and the second power transmission path 12 may be configured to share the same first intermediate rotors 16 as the first intermediate rotors 16 in the respective power transmission paths 11, 12. Thus, it is possible to reduce the size of the power transmission device 10.

Of the plurality of first intermediate rotors 16 described above, the torque receiving portions 16LA, 16RA and the first torque transmitting portions 16LB, 16RB constitute the first power transmission path 11, and the torque receiving portions 16LA, 16RA, the second torque transmitting portions 16LC, 16RC and 16LD, 16RD constitute the second power transmission path 12. That is, the first torque transmitting portions 16LB, 16RB contribute to only the first power transmission path 11 and do not contribute to the second power transmission path 12.

Furthermore, one of the first power transmission path 11 and the second power transmission path 12 may include odd-number more first intermediate rotors 16 than the other. FIGS. 2 to 4 each show a configuration in which, for example, one more first intermediate rotor 16D (the first intermediate rotor 16LD on the left side, the first intermediate rotor 16RD on the right side) is provided on the second power transmission path 12, as compared with the first power transmission path 11. Thus, it is possible to transmit rotational forces opposite to each other to the one driven shaft and the another driven shaft, respectively. Accordingly, it is possible to convey a conveyance object (for example, the metal plate 9) interposed between the one and the another driven shafts toward the same direction.

The second intermediate rotors 17 (the second intermediate rotors 17L on the left, the second intermediate rotors 17R on the right) are each supported so as to rotate while maintaining a constant distance between the rotation center axis thereof and the rotation center axis of the corresponding one of the first intermediate rotors 16. The second intermediate rotors 17 each maintain the inter-axial distance and the parallel positional relationship with the corresponding one of the first intermediate rotors 16, are each configured to be able to arcuately move along the circumferential direction of the first intermediate rotor 16 without sliding with the outer circumference of the first intermediate rotor 16 (due to, for example, engagement or friction of the gears), and thus can also be referred to as, for example, movable gears.

The driving shafts 18 are each arranged with the rotation center axis thereof being in parallel to the rotation center axis of a corresponding one of the driven shafts 2 (see FIG. 1). The rotation center axis of the driving shaft 18 and the rotation center axis of the driven shaft 2 may be arranged coaxially, for example. The driving shaft 18 is coupled to the driven shaft 2, thereby being configured to be able to move following movement of the driven shaft 2 in a direction perpendicular to the axis direction thereof. In some embodiments, for example, as shown in FIGS. 1 to 4, if the power transmission device 10 includes both the first power transmission path 11 and the second power transmission path 12, it is configured such that the inter-axial distance is changed while maintaining the parallel positional relationship between the driving shafts 18 of the respective power transmission paths, following a change in inter-axial distance of the driven shafts 2. For example, in FIG. 2, a drive gear 18A moves upward if the second intermediate body 17LA arcuately moves counterclockwise along the outer circumference of the first torque transmitting portion 16LB (first intermediate rotor 16) while centering around the axial center of the first torque transmitting portion 16LB. On the other hand, the drive gear 18A moves downward if the second intermediate body 17LA arcuately moves clockwise along the outer circumference of the first torque transmitting portion 16LB (first intermediate rotor 16) while centering around the axial center of the first torque transmitting portion 16LB.

As described above, in the power transmission device 10, each of the driving shafts 18 is configured to be able to move in the direction perpendicular to the axial center direction of the driving shaft 18 in accordance with movement of the second intermediate rotors 17 around the first intermediate rotors 16.

For example, as shown in FIG. 1, in the case of the power transmission device 10 which applies a rotational torque to each of the pair of driven shafts 2 arranged to be spaced apart vertically, the first power transmission path 11 (upper side) and the second power transmission path 12 (lower side) may be provided on either the left or right side (for example, only on the left side in FIG. 2) when viewed from the axial center direction as illustrated in FIG. 2, or the first power transmission path 11 and the second power transmission path 12 may be provided on both the left side and the right side when viewed from the axial center direction as illustrated in FIGS. 3 and 4.

As described above, with a configuration in which the driving shaft 18 of at least one of the first power transmission path 11 or the second power transmission path 12 can move in the direction perpendicular to the axial center direction by moving (for example, arcuately) each of the second intermediate rotors 17 along the outer circumference of the corresponding one of the first intermediate rotors 16 which has the axial center position fixed to the output shaft 15 of the motor, it is possible to suppress misalignment between the driving shaft 18 and the corresponding driven shaft (for example, the mill roll 2) connected to the driving shaft 18. Thus, it is possible to transmit the torque with high efficiency following the inter-axial distance of the driven shafts while suppressing the contact area by suppressing extension of the shaft couplings 5. Moreover, it is possible to increase the area of an engagement surface or a friction surface between the driving shafts 18 and the driven shafts contributing to power transmission. Thus, it is possible to, for example, reduce the diameter of each of the shaft couplings 5 when the same torque is transmitted. In other words, it is possible to increase a load capacity if the diameter of the shaft coupling 5 is the same. Furthermore, it is possible to prevent breakage owing to partial contact or an increase in load on a tooth surface, and to reduce a surface pressure and sliding of the tooth surface at the time of power transmission. Thus, it is possible to increase the lifetime of the device by suppressing friction.

Subsequently, as shown in FIGS. 3 and 4 as non-limited examples, in some embodiments, at least one of the first power transmission path 11 or the second power transmission path 12 may include at least one pair of first intermediate rotors 16 (16L, 16R) arranged on one side and the other side across the output shaft 15 of the motor 14, and a pair of second intermediate rotors 17 (17L, 17R) arranged on one side and the other side across the output shaft 15 of the motor 14. For example, FIGS. 3 and 4 each show a configuration in which the second power transmission path 12 (for example, the lower side) includes two pairs of right and left first intermediate rotors 16 (16L, 16R), and a pair of right and left second intermediate rotors 17 (17L, 17R) when viewed from the axis direction of the output shaft 15. However, only the first power transmission path 11 may include two pairs of right and left first intermediate rotors 16 (16L, 16R) and a pair of right and left second intermediate rotors 17 (17L, 17R).

With such a configuration in which the driving force of the motor 14 is transmitted by a pair of, that is, a plurality of rotors (first intermediate rotors 16L, 16R or the second intermediate rotors 17L, 17R), it is possible to decrease the diameter of each of the rotors as compared with a case in which, for example, one rotor transmits the same torque. Thus, it is possible to reduce the size of the power transmission device 10.

Figure 5A:
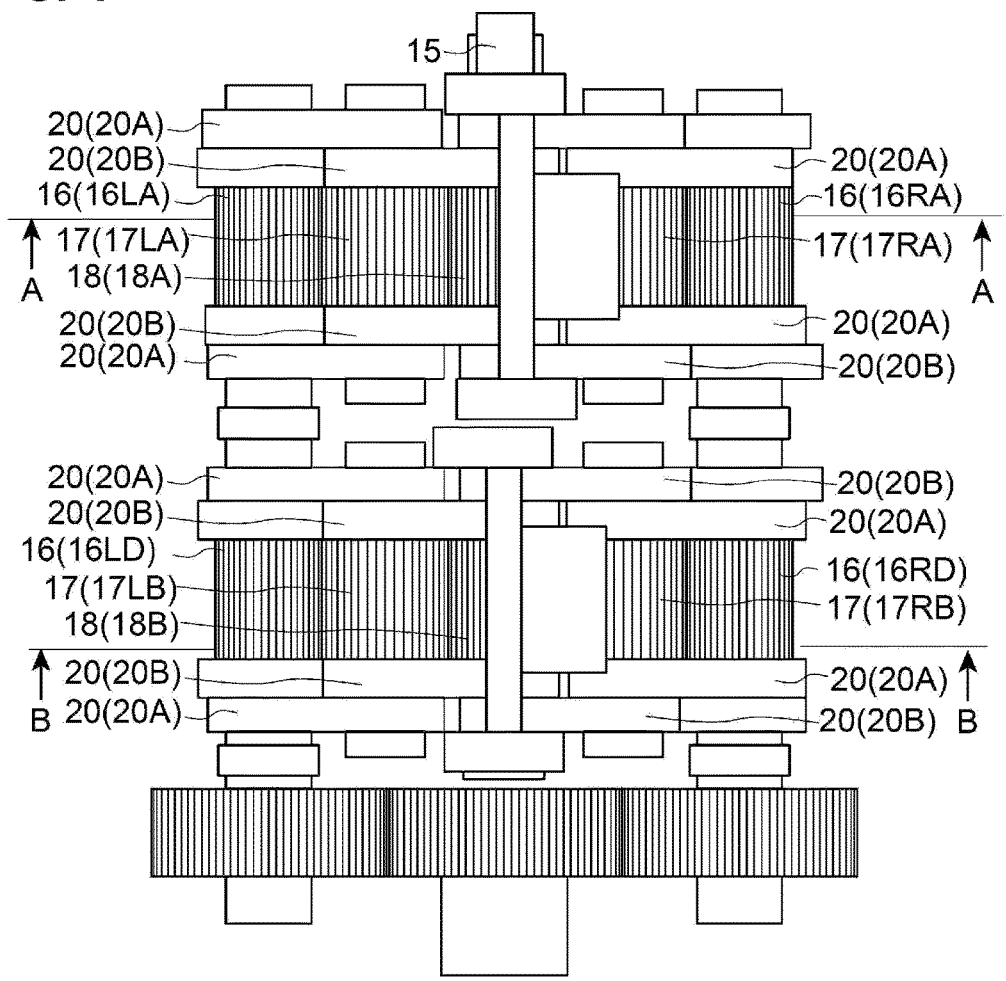
FIG. 5A is a schematic view (planar view) showing a configuration example of the power transmission device according to an embodiment.
Figure 5B:
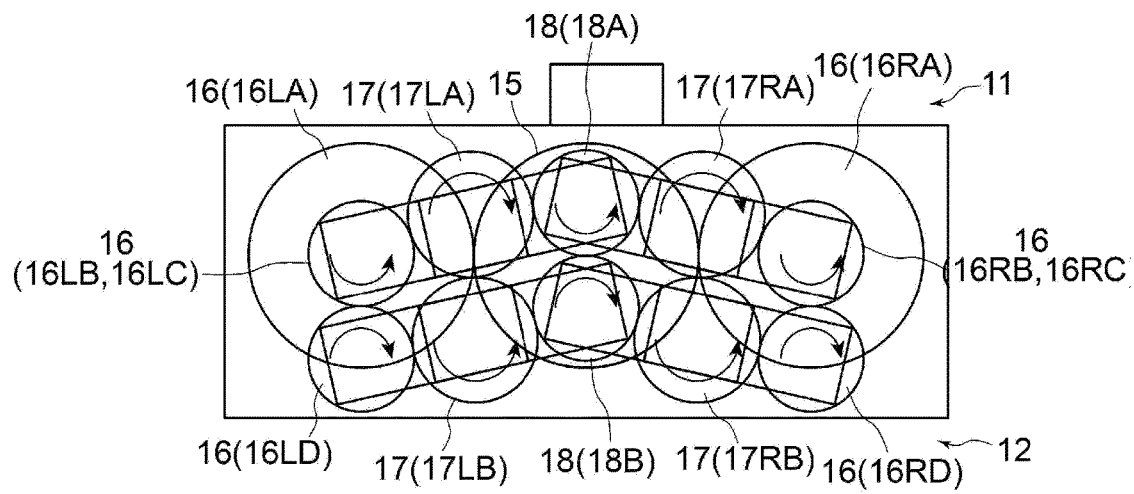
FIG. 5B is a schematic view (side view) showing a configuration example of the power transmission device according to an embodiment.
Figure 6A:
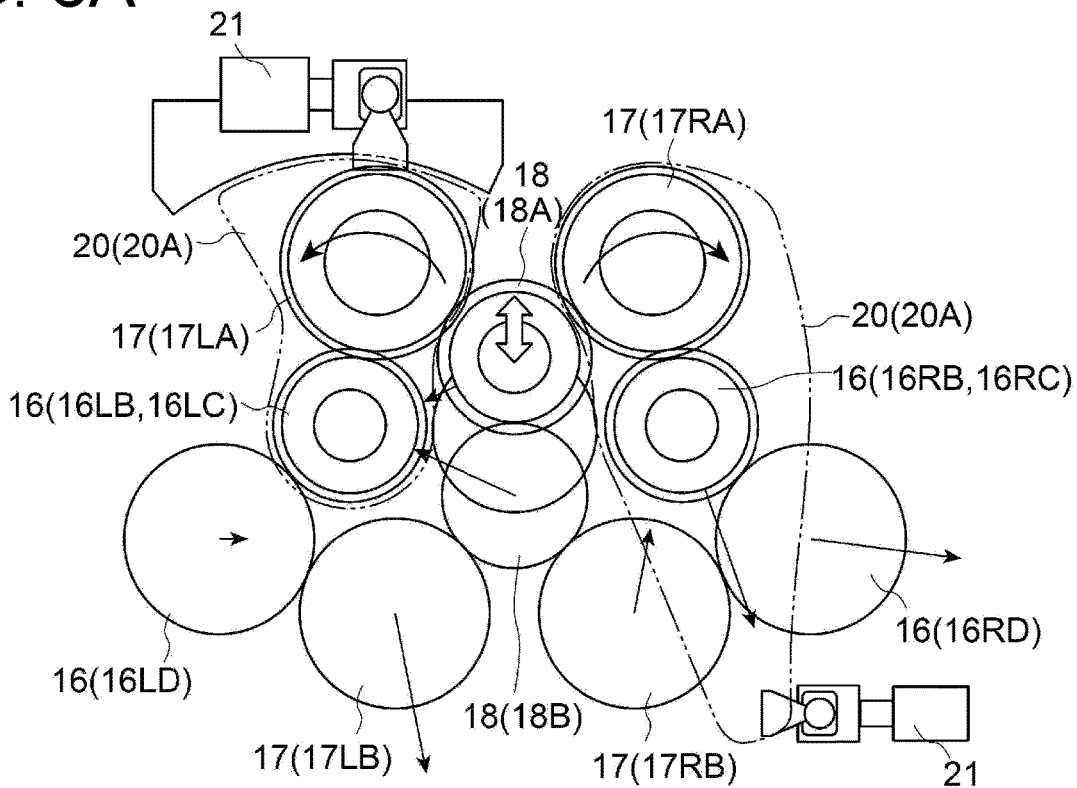
FIG. 6A is a view showing a cross-section taken along line A-A of FIG. 5A and a schematic view showing a (first) power transmission path arranged on the upper side.
Figure 6B:
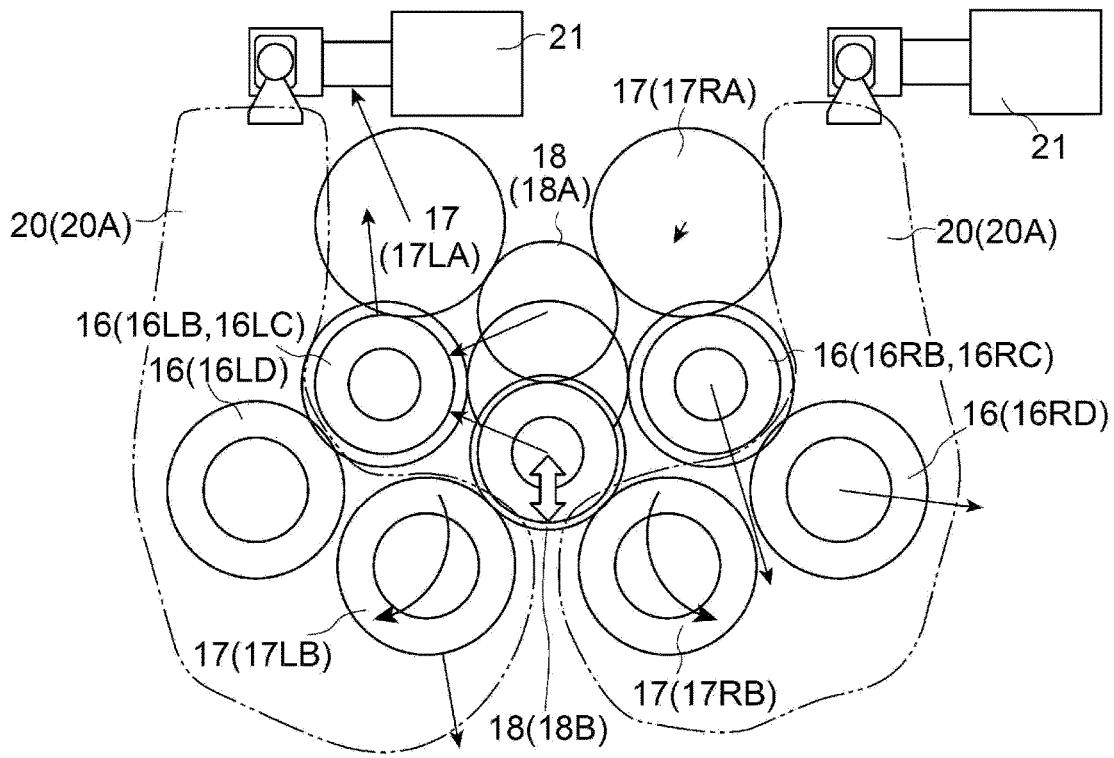
FIG. 6B is a view showing a cross-section taken along line B-B of FIG. 5A and a schematic view showing a (second) power transmission path arranged on the lower side.
Figure 7:
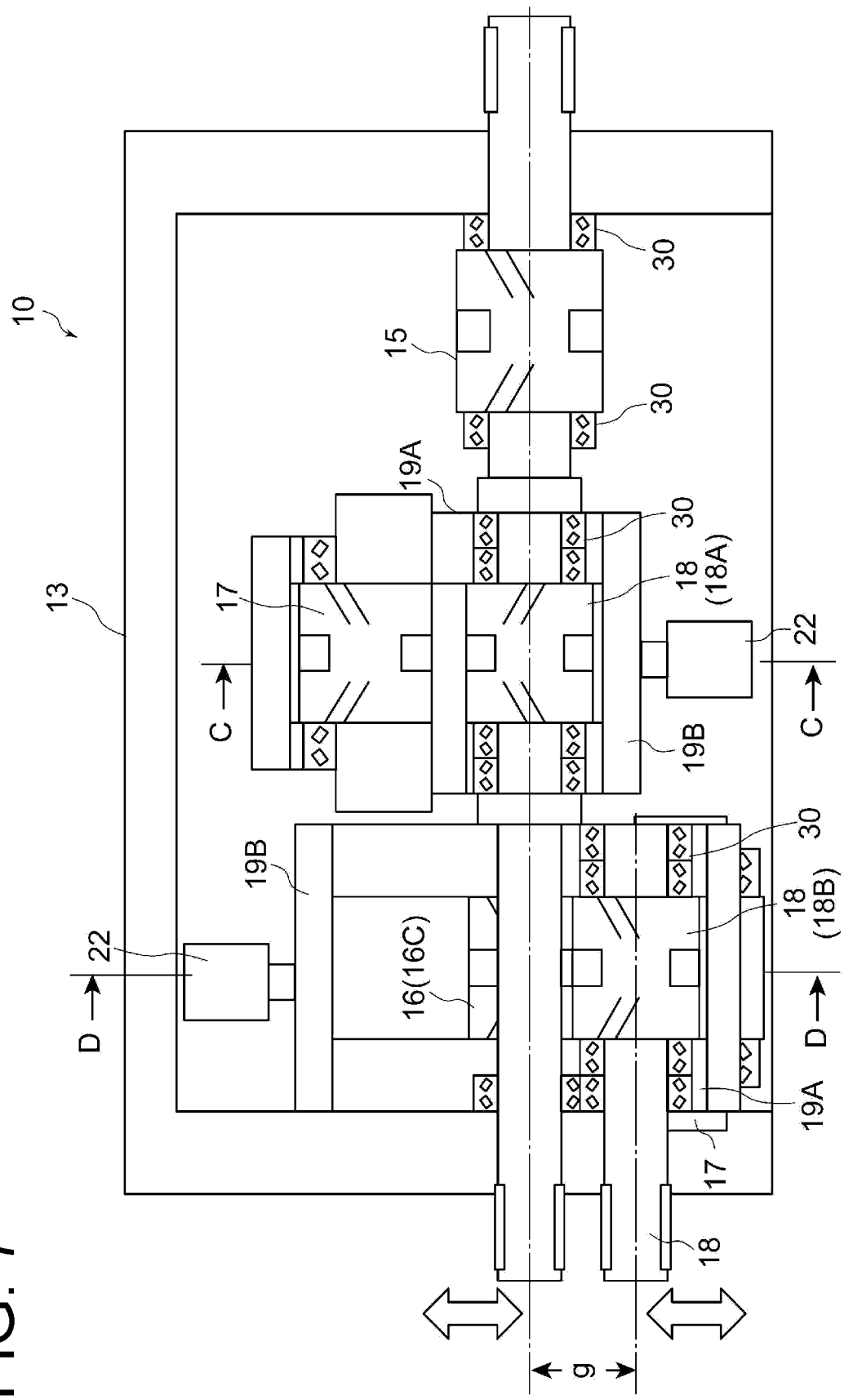
FIG. 7 is a schematic side view showing a configuration example of the power transmission device according to an embodiment.
Figure 8A:
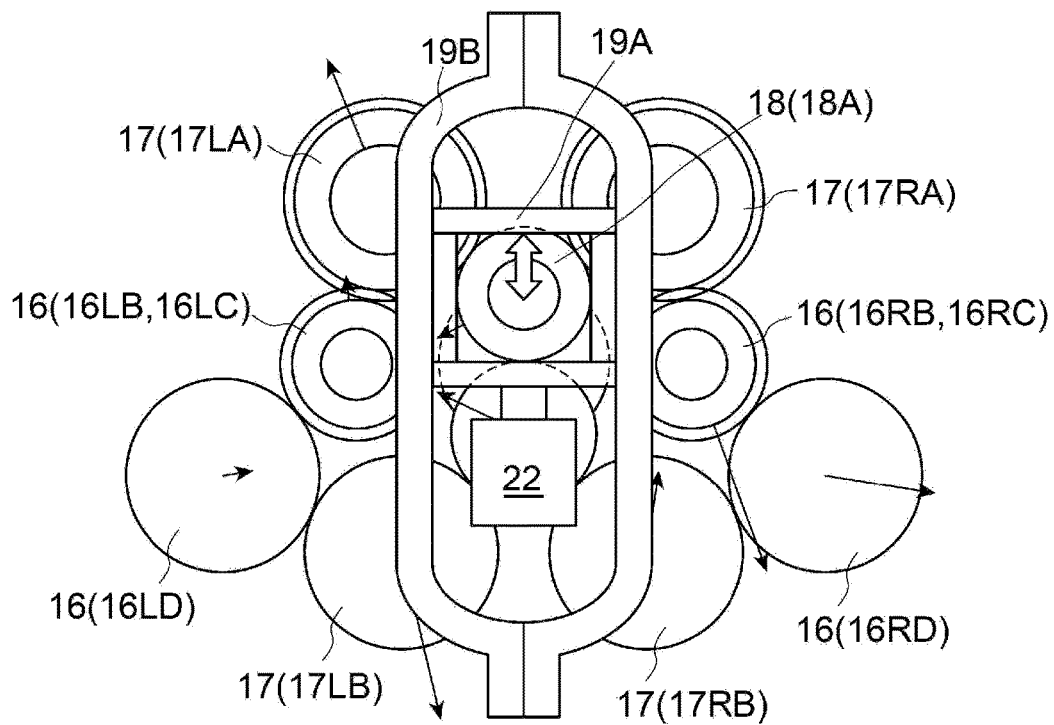
FIG. 8A is a schematic view showing a cross-section taken along line C-C of FIG. 7 and showing a driving shaft moving mechanism in the (first) power transmission path arranged on the upper side.
Figure 8B:
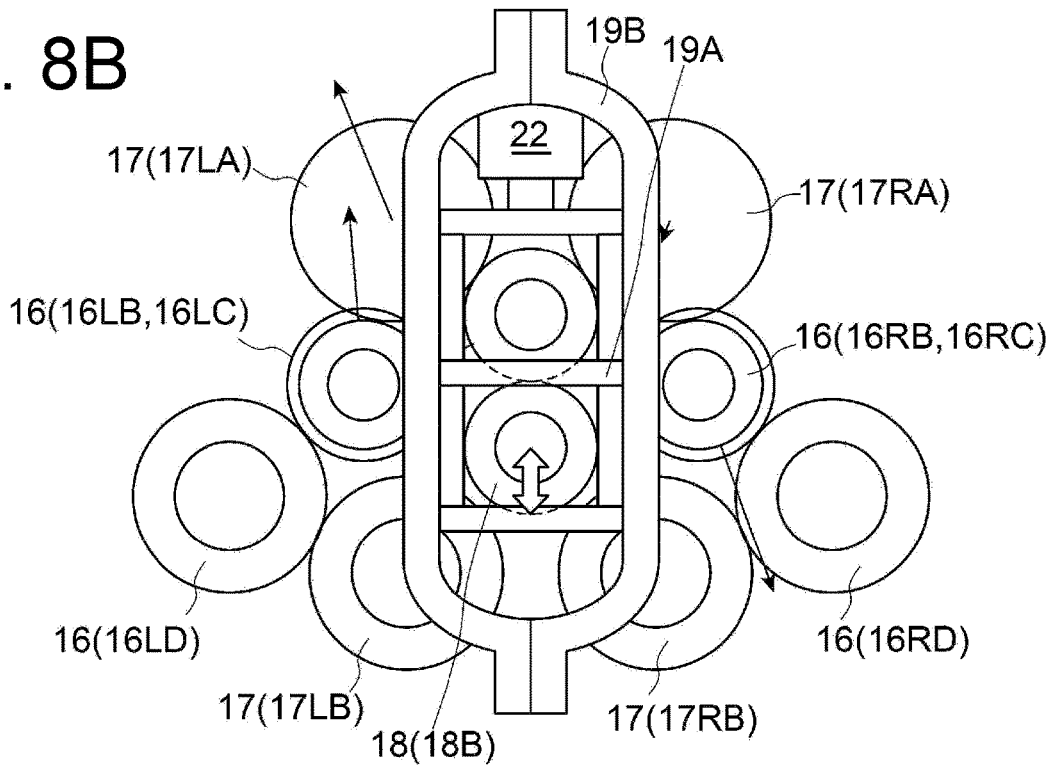
FIG. 8B is a schematic view showing a cross-section taken along line D-D of FIG. 7 and showing a driving force moving mechanism in the (second) power transmission path arranged on the lower side.

FIG. 5A is a schematic view (planar view) showing a configuration example of the power transmission device according to an embodiment. FIG. 5B is a schematic view (side view) showing a configuration example of the power transmission device according to an embodiment. FIG. 6A is a view showing a cross-section taken along line A-A of FIG. 5A and a schematic view showing the (first) power transmission path arranged on the upper side. FIG. 6B is a view showing a cross-section taken along line B-B of FIG. 5A and a schematic view showing the (second) power transmission path arranged on the lower side. FIG. 7 is a schematic side view showing a configuration example of the power transmission device according to an embodiment. FIG. 8A is a schematic view showing a cross-section taken along line C-C of FIG. 7 and showing a driving shaft moving mechanism in the (first) power transmission path arranged on the upper side. FIG. 8B is a schematic view showing a cross-section taken along line D-D of FIG. 7 and showing a driving force moving mechanism in the (second) power transmission path arranged on the lower side.

As shown in FIGS. 3 to 8B as non-limited examples, in some embodiments, the first intermediate rotors 16 may respectively be arranged symmetrically across the driving shafts 18, and the second intermediate rotors 17 may respectively be arranged symmetrically across the driving shafts 18. That is, the first intermediate rotors 16 may respectively be arranged at the same distance from the driving shafts 18 across the driving shafts 18, and the second intermediate rotors 17 may respectively be arranged at the same distance from the driving shafts 18 across the driving shafts 18.

Since the first intermediate rotors 16 are respectively thus arranged symmetrically across the driving shafts 18, and the second intermediate rotors 17 are respectively thus arranged symmetrically across the driving shafts 18, it is possible to provide the power transmission device 10 which can be decreased in size while suppressing vibrations at the time of power transmission.

In some embodiments, in the above-described configuration in which the first intermediate rotors 16 and the second intermediate rotors 17 are symmetrically arranged across the driving shafts 18, the driving shafts 18 may include the first driving shaft (drive gear) 18A and a second driving shaft (drive gear) 18B. The first driving shaft (drive gear) 18A constitutes the first power transmission path 11 and moves in the first moving direction in accordance with movement of the second intermediate rotors 17LA, 17LB around the first intermediate rotors 16LB, 16RB of the first power transmission path 11. The second driving shaft (drive gear) 18B constitutes the second power transmission path 12 and moves in the second moving direction opposite to the first moving direction in accordance with movement of the second intermediate rotors 17LB, 17RB around the first intermediate rotors 16LD, 16RD of the second power transmission path 12.

With the above configuration, since the first driving shaft 18A and the second driving shaft 18B respectively move in the first moving direction and the second moving direction opposite to each other, it is possible to move the one driven shaft 2A coupled to the first driving shaft 18A and the another driven shaft 2B coupled to the second driving shaft 18B to contact/separate from each other by changing a distance between the driven shafts 2A and 2B.

In some embodiments, in the configuration in which the above-described driving shafts 18 include the first driving shaft 18A and the second driving shaft 18B, the first driving shaft 18A may be configured to move in the first moving direction when the second intermediate rotors 17 (17LA, 17RA) of the first power transmission path 11 respectively rotate about the axial centers of the first intermediate rotors 16 (16LB, 16RB) in one direction of either the clockwise direction or the counterclockwise direction as viewed from the axial center direction. In addition, the second driving shaft 18B may be configured to move in the second moving direction when the second intermediate rotors 17 (17LB, 17RB) of the second power transmission path 12 respectively rotate about the axial centers of the first intermediate rotors 16 (16LD, 16RD) in the other direction of either the clockwise direction or the counterclockwise direction as viewed from the above-described axial center direction.

With the above configuration, the first driving shaft moves in the first moving direction when the second intermediate rotors of the first power transmission path rotate in one direction of either the clockwise direction or the counterclockwise direction as viewed from the axial center direction, and the second driving shaft moves in the second moving direction when the second intermediate rotors of the second power transmission path rotate in the above-described other direction of either the clockwise direction or the counterclockwise direction as viewed from the above-described axial direction. That is, it is possible to move the first driving shaft and the second driving shaft in the different directions by rotating the second intermediate rotors of the first power transmission path and the second intermediate rotors of the second power transmission path about the axial centers of the first intermediate rotors in the different directions as viewed from the same axial direction. Alternatively, it may be possible to move the first driving shaft and the second driving shaft in the same direction by rotating the second intermediate rotors of the first power transmission path and the second intermediate rotors of the second power transmission path about the axial centers of the first intermediate rotors in the same direction as viewed from the same axial direction.

In some embodiments, for example, as illustrated in FIGS. 1 to 3, 5A, and 7, the driving shaft 18 (first driving shaft 18A) of the first power transmission path 11 may be arranged to be shifted from the second driving shaft 18B in the axial center direction and may be arranged so as not to overlap the second driving shaft 18B in the planar view. That is, the driving shaft 18 of the first power transmission path 11 and the driving shaft 18 of the second power transmission path 12 can be arranged so as not to overlap each other in the planar view (for example, see FIG. 1). In addition, the driving shaft 18 of the first power transmission path 11 and the driving shaft 18 of the second power transmission path 12 can be arranged to be vertically shifted from each other in the side view, and can be arranged so a shaft member coupling one of the driving shafts 18 and the corresponding driven shaft 2, and the other driving shaft 18 do not interfere (or overlap) each other when the one or the other driving shaft 18 vertically moves following the inter-axial distance of the driven shafts 2.

With the above-described configuration in which the respective driving shafts 18 of the first power transmission path 11 and the second power transmission path 12 are shifted from each other in the axial center direction, and do not interfere with each other, it is possible to avoid the interference between both the driving shafts 18, which is caused when one of the driving shafts 18 follows the corresponding driven shaft. Therefore, it is possible to provide the power transmission device 10 reliably transmitting a torque while smoothly following the change in inter-axial distance of the driven shafts.

In some embodiments, for example, as illustrated in FIGS. 1 to 8B, both the first power transmission path 11 and the second power transmission path 12 may include the first intermediate rotors 16, the second intermediate rotors 17, and the driving shafts 18. That is, the first power transmission path 11 and the second power transmission path 12 are respectively configured to transmit power to the pair of driven shafts 2, and may be configured to be able to move the driving shafts 18 thereof in the direction perpendicular to the axis direction of the driving shafts 18 independently of each other.

Thus, with the configuration in which the respective driving shafts 18 of the first power transmission path 11 and the second power transmission path 12 move in the direction perpendicular to the axial center direction, it is possible to smoothly follow even displacement of either driven shaft when the inter-axial distance of the driven shafts changes. Moreover, since the two driven shafts 2 can be driven by the one motor 14, it is possible to reduce the size of the power transmission device 10.

The above-described second intermediate rotors 17 may be supported such that a distance with the first intermediate rotors 16 is constrained or may be supported so as to be biased toward the first intermediate rotors 16 in at least some of the rotating shafts thereof so that a constant distance with the first intermediate rotors 16 is maintained. Furthermore, the second intermediate rotors 17 may be supported such that a distance with the driving shafts 18 is constrained or may be supported so as to be biased toward the driving shafts 18 in at least some of the rotating shafts thereof so that a constant distance with the driving shafts 18 is maintained. As components constraining the above-described distance, for example, guide grooves guiding the respective shafts, links 20 to be described later, or the like can be given.

In some embodiments, in the power transmission device 10, some or all of the first intermediate rotors 16, the second intermediate rotors 17, and the driving shafts 18 may be coupled to each other via the links 20, for example, as illustrated in FIGS. 4 to 6B. More specifically, the power transmission device 10 may include, for example, links 20A which maintain a constant axial-center distance between the first intermediate rotors 16 and the second intermediate rotors 17. In this case, the links 20A may respectively be disposed at both ends of the torque receiving portions 16A, both ends of the first torque transmitting portions 16B, and both ends of the second torque transmitting portions 16C in the axial direction, for example, as shown in FIG. 5A. The links 20A can be configured such that each of the second intermediate rotors 17 swings about the axial center (rotation center axis) of the corresponding one of the first intermediate rotors 16.

In addition, the power transmission device 10 may include links 20B which maintain a constant axial-center distance between the second intermediate rotors 17 and the driving shafts 18, for example, as shown in FIG. 5A. In this case, the links 20B may respectively be disposed at both ends of the second intermediate rotors 17 and the driving shafts 18 in the axial direction, for example, as shown in FIG. 5A.

With the above configuration, it is possible to maintain the constant axial-center distance between the first intermediate rotors 16 and the second intermediate rotors 17 by the links 20 (20A). Therefore, it is possible to reliably transmit power without any sliding or idling occurring between both the intermediate rotors 16 and 17 even if the second intermediate rotors 17 move on the circular arcs of the first intermediate rotors 16 along with movement of the driving shafts 18 following the change in inter-axial distance of the driven shafts 2, for example, as shown in FIGS. 4, 6A, and 6B. It is also possible to maintain the constant axial-center distance between the second intermediate rotors 17 and the driving shafts 18 by the links 20 (20B). Therefore, it is possible to reliably transmit power without any sliding or idling occurring between both the second intermediate rotors 17 and the driving shafts1 8 even if the driving shafts 18 move on the circular arcs of the second intermediate rotors 17 along with movement of the driving shafts 18 following the change in inter-axial distance of the driven shafts 2.

In the configuration including the above-described links 20, the power transmission device 10 may include first drive portions 21 each of which is connected to a point of effort of a corresponding one of the links 20 (20A) holding the second intermediate rotor 17 at a point of load with the axial center of the first intermediate rotor 16 as a fulcrum, and applies a swing force of moving the second intermediate rotor 17 along the outer circumference of the first intermediate rotor 16.

The drive portions 21 can each be constituted by an actuator such as an electromagnetic solenoid, a motor, a hydraulic cylinder, or the like. The first drive portions 21 can be controlled such that, in accordance with movement of the driven shafts 2, the second intermediate rotors 17 move on the circular arcs of the first intermediate rotors 16 so as to maintain the relative positional relationship between the driven shafts 2 and the driving shafts 18 coupled thereto.

More specifically, for example, the first drive portions 21 which can swing the second intermediate rotors 17 about the first intermediate rotors 16 in the first power transmission path 11 are arranged, for example, as shown in FIG. 6A. In FIG. 6A, the first drive portion 21 swinging the left-handed second intermediate rotor 17 (17LA) of the first power transmission path 11 is connected to the upper part of the link 20A (in other words, on the same side as the point of load with respect to the fulcrum of the link 20A) which couples the first intermediate rotor 16 (16LA) and the second intermediate rotor 17 (17LA), and the link 20A swings about the first intermediate rotor 16 (16LA) by moving the output shaft of the first drive portion 21 toward the horizontal direction, thereby moving the second intermediate rotor 17 (17LA). Moreover, in FIG. 6A, the first drive portion 21 swinging the right-handed second intermediate rotor 17 (17RA) of the first power transmission path 11 is connected to the lower part of the link 20A (in other words, on the side opposite to the point of load with respect to the fulcrum of the link 20A) which couples the first intermediate rotor 16 (16RA) and the second intermediate rotor 17 (17RA), and the link 20A swings about the first intermediate rotor 16 (16RA) by moving the output shaft of the first drive portion 21 toward the horizontal direction, thereby moving the second intermediate rotor 17 (17RA). In the illustrated example, the links 20A arranged on the right side and the left side can each be formed such that the fulcrum, the point of effort, and the point of load thereof are disposed linearly, for example.

On the other hand, the first drive portions 21 which can swing the second intermediate rotors 17 (17LB, 17RB) about the first intermediate rotors 16 (16LD, 16RD) in the second power transmission path 12 are arranged, for example, as shown in FIG. 6B. In FIG. 6B, the first drive portion 21 swinging the left-handed second intermediate rotor 17 (17LB) and the first drive portion 21 swinging the right-handed second intermediate rotor 17 (17RB) of the second power transmission path 12 are connected to the upper parts of the links 20A (in other words, on the side opposite to the points of load with respect to the fulcrums of the links 20A) which respectively couple the first intermediate rotors 16 (16LD, 16RD) and the second intermediate rotors 17 (17LB, 17RB), and the links 20A swing about the first intermediate rotors 16 (16LD, 16RD) by moving the output shafts of the first drive portions 21 toward the horizontal direction, thereby moving the second intermediate rotors 17 (17LB, 17RB). As shown in FIG. 6B, if the respective first drive portions 21 are arranged with their output shaft being oriented to the same direction, the respective first drive portions 21 can be controlled to advance and retract in an opposite phase. Moreover, although not illustrated, the respective first drive portions 21 can be controlled in the same phase if arranged to face each other, for example. In the illustrated example, the links 20A arranged on the right side and the left side can each be formed such that the fulcrum, the point of effort, and the point of load thereof are disposed to form an L-shape, for example.

With the above configuration, the first drive portions 21 can actively move the second intermediate rotors 17 along the circular arcs of the first intermediate rotors 16. Thus, it is possible to reduce a load on the driving shafts 18 associated with the change in inter-axial distance of the mill rolls 2 serving as the driven shafts, if the change in inter-axial distance of the mill rolls 2 serving as the driven shafts and movement of the second intermediate rotors 17 by the first drive portions 21 are synchronized with each other, for example.

Furthermore, the power transmission device 10 may include the second drive portions 22 for moving the driving shafts 18 in the direction perpendicular to the axial center direction, for example, as shown in FIGS. 4, 7, 8A, and 8B.

The second drive portions 22 can each be constituted by an actuator such as an electromagnetic solenoid, a motor, a hydraulic cylinder, or the like. The second drive portions 22 can be controlled so as to maintain the relative positional relationship between the driven shafts 2 and the driving shafts 18 coupled thereto in accordance with movement of the driven shafts 2.

More specifically, for example, the second drive portion 22 which moves the driving shaft 18 in the first power transmission path 11 in the direction perpendicular to the axial center direction of the driving shaft 18 (for example, the vertical direction) is arranged, for example, as shown in FIG. 8A. In FIG. 8A, the second drive portion 22 is connected to the lower part of the support 19B with the output shaft thereof being oriented upward, and the output shaft of the second drive portion 22 moves toward the vertical direction, thereby moving the driving shaft 18 along the vertical direction. The support 19B guides the frame 19A holding the bearing 30 of the driving shaft 18.

On the other hand, the second drive portion 22 which moves the driving shaft 18 in the second power transmission path 12 in the direction perpendicular to the axial center direction of the driving shaft 18 (for example, the vertical direction) is arranged, for example, as shown in FIG. 8B. In FIG. 8B, the second drive portion 22 is connected to the upper part of the support 19B with the output shaft thereof being oriented downward, and the output shaft of the second drive portion 22 moves toward the vertical direction, thereby moving the driving shaft 18 along the vertical direction. The support 19B guides the frame 19A holding the bearing 30 of the driving shaft 18.

With the above configuration in which the second drive portions 22 move the driving shafts 18 in the direction perpendicular to the axial center direction, for example, it is possible to reduce a load on the driving shafts 18 associated with the change in inter-axial distance of the driven shafts, if the change in inter-axial distance of the driven shafts and movement of the first driving shaft 18 by the second drive portion 22 are synchronized with each other, for example.

Then, in the configuration in which the above-described power transmission device 10 includes the second drive portions 22, the rolling mill 1 may include the third drive portions 23 which apply power to change the inter-axial distance of the pair of mill rolls 2 (for example, see FIG. 1). The third drive portions 23 can each be constituted by an actuator such as an electromagnetic solenoid, a motor, a hydraulic cylinder, or the like. Then, the pair of mill rolls 2 and the pair of driving shafts 18 may each be configured to maintain the same inter-axial distance by causing at least the second drive portions 22 and the third drive portions 33 to work together. In this case, the power transmission device 10 may further include the above-described first drive portions 21, and the first drive portions 21, the second drive portions 22, and the third drive portions 23 may be configured to smoothly work together.

With the above configuration in which the second drive portions 22, which move at least the driving shafts 18 in the direction perpendicular to the axial center direction, and the third drive portions 23, which apply power to change the inter-axial distance of the pair of mill rolls 2, work together, it is possible to maintain the same inter-axial distance between each of the pair of mill rolls 2 and the pair of driving shafts 18 while suppressing a load between the pair of mill rolls 2 and the pair of driving shafts 18 associated with the change in inter-axial distance. Thus, it is possible to extend the lifetime of the device.

Figure 9:
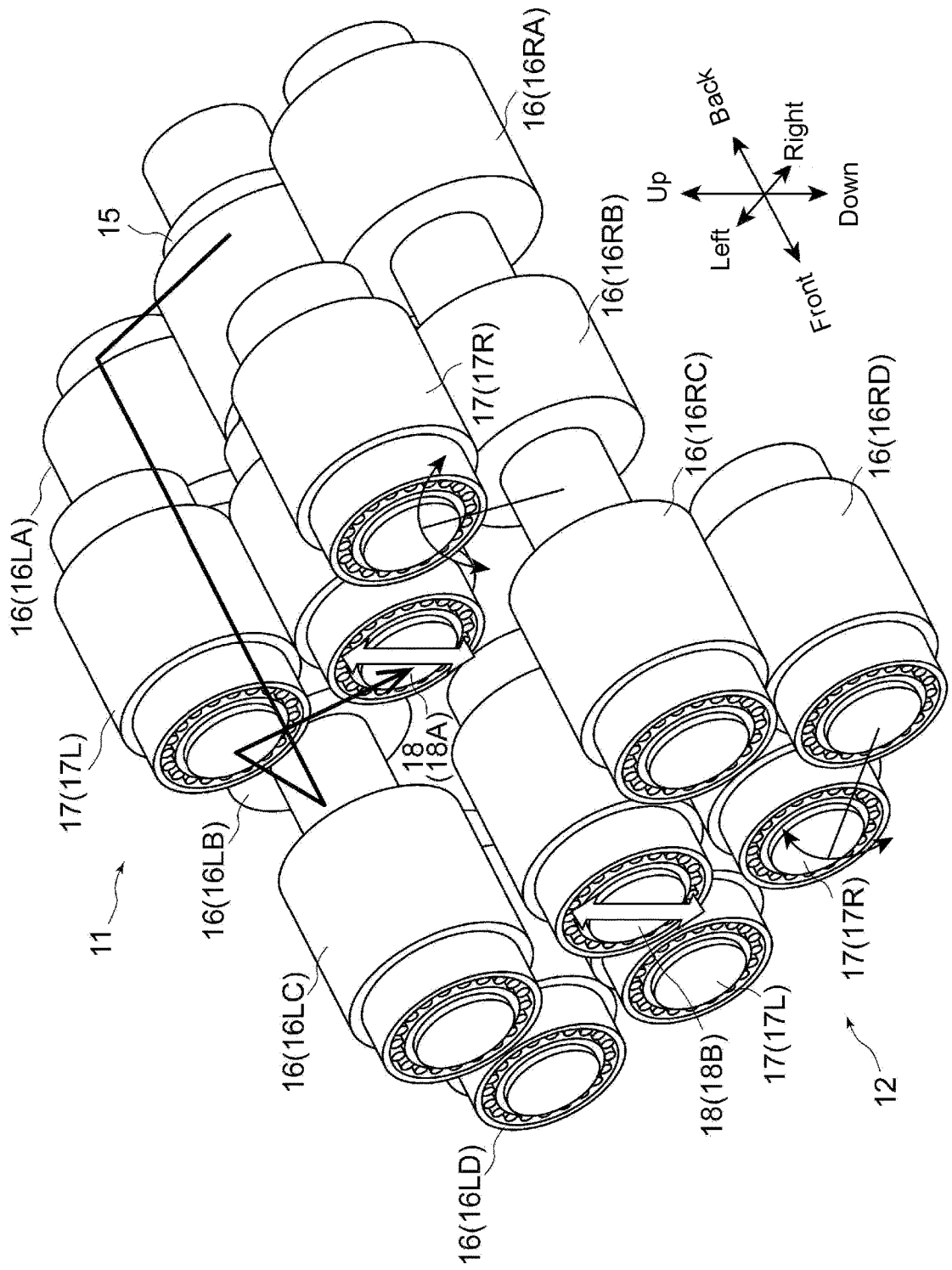
FIG. 9 is a schematic perspective view showing a configuration example of the power transmission device according to another embodiment.

FIG. 9 is a schematic perspective view showing a configuration example of the power transmission device according to another embodiment.

The output shaft 15 of the motor 14, the first intermediate rotors 16, the second intermediate rotors 17, or the driving shafts 18 may be configured to include rotors, for example, as shown in FIG. 9 as a non-limited example. That is, the output shaft 15, the first intermediate rotors 16, the second intermediate rotors 17, and the driving shafts 18 may each be configured to transmit a rotational torque by skin friction thereof.

With the above configuration in which the output shaft 15 of the motor 14, the first intermediate rotors 16, the second intermediate rotors 17, or the driving shafts 18 include the rotors, it is possible to reduce vibrations and operating noise at the time of operation. In addition, it is possible to reduce backlashes as compared with a configuration in which the above-described output shaft 15, first intermediate rotors 16, second intermediate rotors 17, and driving shafts 18 include gears. Thus, it is possible to reduce a power transmission loss. Moreover, since it is unnecessary to process teeth of the gears, it is possible to reduce a man-hour and a cost for manufacture.

According to at least one embodiment of the present disclosure described above, it is possible to provide a configuration in which the torque is transmitted following the inter-axial distance of the driven shafts while suppressing the contact area.

Embodiments of the present invention were described in detail above, but the present invention is not limited thereto, and various amendments and modifications may be implemented. For example, in some embodiments described above, a drive device which drives the mill rolls 2 of the rolling mill 1 is exemplified as the power transmission device 10. However, the power transmission device 10 of the present invention is not limited to this. For example, the power transmission device 10 may be a drive device for driving a volumetric pump. As the volumetric pump, for example, a vane pump or a geared pump may be adopted.

Moreover, in another embodiment, one of the first power transmission path 11 and the second power transmission path 12 may include the first intermediate rotors 16, the second intermediate rotors 17, and the driving shafts 18. For example, it may be configured such that only the first power transmission path 11 arranged on the upper side may include the first intermediate rotors 16, the second intermediate rotors 17, and the driving shafts 18, and the upper driving shaft 18 moves vertically. Alternatively, it may be configured such that only the second power transmission path 12 arranged on the lower side may include the first intermediate rotors 16, the second intermediate rotors 17, and the driving shafts 18, and in this case, only the lower driving shaft 18 moves vertically.

REFERENCE SIGNS LIST

1 Rolling mill
2 Mill roll (driven shaft)
5 Shaft coupling
5A Coupling
9 Metal plate
10 Power transmission device (mill roll drive mechanism)
11 First power transmission path
12 Second power transmission path
13 Casing
14 Motor
15 Motor output shaft (input shaft)
16 Intermediate gear (first intermediate rotor)
17 Auxiliary gear (second intermediate rotor)
18 Driving gear (output shaft/driving shaft)
20 Link
21 First drive portion
22 Second drive portion
23 Third drive portion
g Inter-axial distance

The invention claimed is:

1. A power transmission device comprising:
a first power transmission path for transmitting a driving force of a motor to one driven shaft; and
a second power transmission path for transmitting the driving force of the motor to another driven shaft arranged to face the one driven shaft,
wherein at least one of the first power transmission path or the second power transmission path includes:
a first intermediate rotor which has an axial center position fixed to an output shaft of the motor and is rotated by the driving force of the motor;
a second intermediate rotor rotated by the first intermediate rotor and moving along an outer circumference of the first intermediate rotor; and
a driving shaft rotated by the second intermediate rotor and transmitting the driving force to the one driven shaft or the another driven shaft,
wherein the driving shaft is configured to move in a direction perpendicular to an axial center direction of the driving shaft in accordance with movement of the second intermediate rotor around the first intermediate rotor, and
wherein at least one of the first power transmission path or the second power transmission path includes:
at least one pair of first intermediate rotors arranged on one side and the other side across the output shaft of the motor; and a pair of second intermediate rotors arranged on the one side and the other side across the output shaft of the motor.

2. The power transmission device according to claim 1, wherein the power transmission device is configured such that a movement trajectory of an axial center of the second intermediate rotor makes a circular arc of a circle centered at an axial center of the first intermediate rotor.

3. The power transmission device according to claim 1, wherein the pair of first intermediate rotors are arranged symmetrically across the driving shaft, and the pair of second intermediate rotors are arranged symmetrically across the driving shaft.

4. The power transmission device according to claim 3, wherein the driving shaft includes:
   a first driving shaft constituting the first power transmission path and moving in a first moving direction in accordance with movement of the second intermediate rotor around the first intermediate rotor of the first power transmission path; and
   a second driving shaft constituting the second power transmission path and moving in a second moving direction opposite to the first moving direction in accordance with movement of the second intermediate rotor around the first intermediate rotor of the second power transmission path.

5. The power transmission device according to claim 4, wherein the first driving shaft is configured to move in the first moving direction when the second intermediate rotor of the first power transmission path rotates about the axial center of the first intermediate rotor in one direction of either a clockwise direction or a counterclockwise direction as viewed from the axial center direction, and
   wherein the second driving shaft is configured to move in the second moving direction when the second intermediate rotor of the second power transmission path rotates about the axial center of the first intermediate rotor in the other direction of either the clockwise direction or the counterclockwise direction as viewed from the axial center direction.

6. The power transmission device according to claim 5, wherein the first driving shaft is arranged to be shifted from the second driving shaft in the axial center direction and is arranged so as not to overlap the second driving shaft in a planar view.

7. The power transmission device according to claim 4, wherein the first driving shaft is arranged to be shifted from the second driving shaft in the axial center direction and is arranged so as not to overlap the second driving shaft in a planar view.

8. The power transmission device according to claim 1, wherein the first power transmission path and the second power transmission path each include the first intermediate rotor, the second intermediate rotor, and the driving shaft.

9. The power transmission device according to claim 1, further comprising a link which maintains a constant axial-center distance between the first intermediate rotor and the second intermediate rotor rotated by the first intermediate rotor.

10. The power transmission device according to claim 9, further comprising a first drive portion which is connected to a point of effort of the link holding the second intermediate rotor at a point of load with an axial center of the first intermediate rotor as a fulcrum, the first drive portion applying a swing force of moving the second intermediate rotor along the outer circumference of the first intermediate rotor such that a movement trajectory of an axial center of the second intermediate rotor makes a circular arc of a circle centered at the axial center of the first intermediate rotor.

11. The power transmission device according to claim 1, further comprising a second drive portion for moving the driving shaft in the direction perpendicular to the axial center direction.

12. The power transmission device according to claim 1, wherein the output shaft of the motor, the first intermediate rotor, the second intermediate rotor, and the driving shaft are configured to respectively include gears in outer circumferences thereof and to transmit power by engaging with each other via the gears.

13. The power transmission device according to claim 1, wherein the output shaft of the motor, the first intermediate rotor, the second intermediate rotor, or the driving shaft includes a roller.

14. A rolling mill comprising:
   the power transmission device according to claim 1; and
   the one driven shaft and the another driven shaft rotated by the driving shaft of the power transmission device,
   wherein the one driven shaft and the another driven shaft include a pair of mill rolls having a variable inter-axial distance therebetween.

15. The rolling mill according to claim 14, further comprising a third drive portion applying power to change the inter-axial distance of the pair of mill rolls,
   wherein the pair of mill rolls and the pair of driving shafts are each configured to maintain the same inter-axial distance by causing at least the third drive portion and the drive portion for moving the driving shaft in the direction perpendicular to the axial center direction to work together.

16. A power transmission device comprising:
   a first power transmission path for transmitting a driving force of a motor to one driven shaft; and
   a second power transmission path for transmitting the driving force of the motor to the another driven shaft arranged to face the one driven shaft,
   wherein at least one of the first power transmission path or the second power transmission path includes:
      a first intermediate rotor which has an axial center position fixed to an output shaft of the motor and is rotated by the driving force of the motor;
      a second intermediate rotor rotated by the first intermediate rotor and moving along an outer circumference of the first intermediate rotor; and
      a driving shaft rotated by the second intermediate rotor and transmitting the driving force to the one driven shaft or the another driven shaft,
   wherein the driving shaft is configured to move in a direction perpendicular to an axial center direction of the driving shaft in accordance with movement of the second intermediate rotor around the first intermediate rotor, and
   wherein the power transmission device further includes:
      a link which maintains a constant axial-center distance between the first intermediate rotor and the second intermediate rotor rotated by the first intermediate rotor; and
      a first drive portion which is connected to a point of effort of the link holding the second intermediate rotor at a point of load with an axial center of the first intermediate rotor as a fulcrum, the first drive portion applying a swing force of moving the second intermediate rotor along the outer circumference of the first intermediate rotor such that a movement trajectory of an axial center of the second intermediate rotor makes a circular arc of a circle centered at the axial center of the first intermediate rotor.

\* \* \* \* \*